United States Patent Office 3,600,485
Patented Aug. 17, 1971

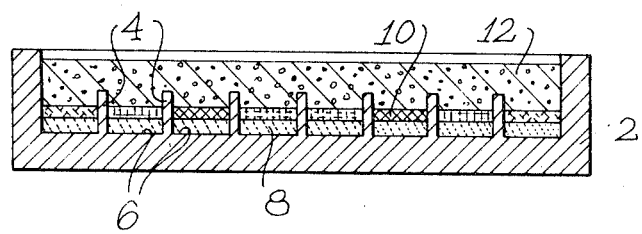
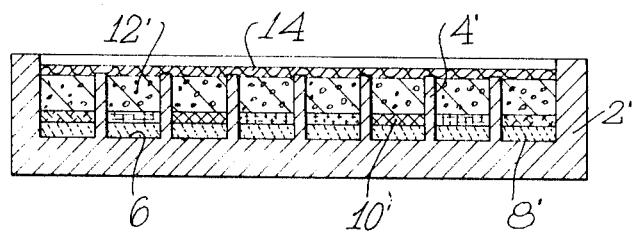
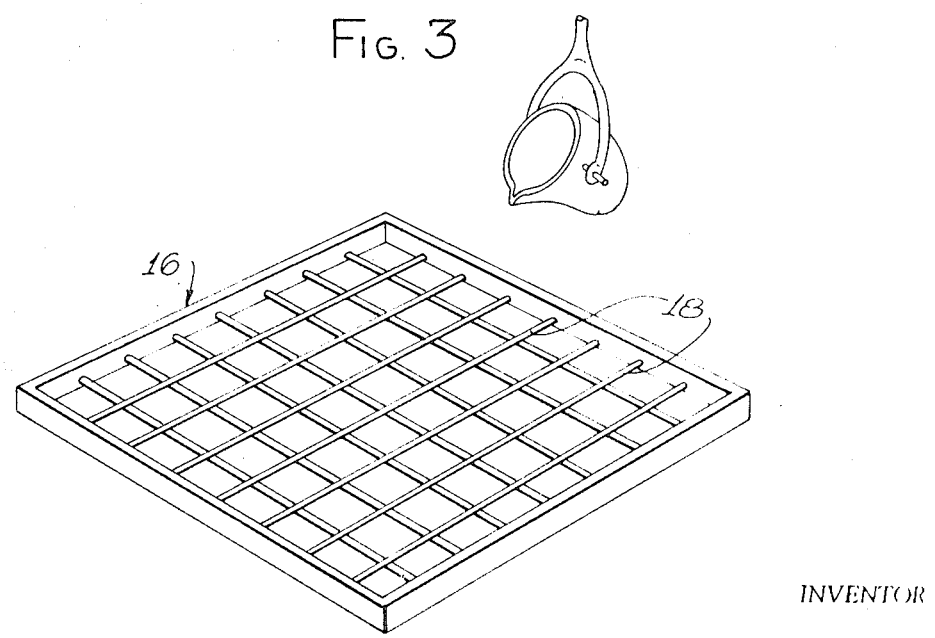

3,600,485
METHOD OF PRODUCING SYNTHETIC STONE MEMBERS SIMULATING MOSAICS
Shlomo Brauner, 46 Yahalom, Ramat Gan, Israel
Filed May 22, 1967, Ser. No. 640,307
Claims priority, application Israel, May 26, 1966, 25,848
Int. Cl. B29c 9/00
U.S. Cl. 264—74                                         3 Claims

ABSTRACT OF THE DISCLOSURE

A method of producing synthetic stone members simulating mosaics is described, in which there is provided a mould having partitions dividing the bottom into a plurality of compartments, introducing into the compartments a layer of a liquid transparent material, a layer of a colored liquid plastic material, and then a layer of a backing material. According to a further feature the colored layer may be produced by pouring the plastic material through a screen having a plurality of spaced strands coated with coloring matter. The transparent and the colored layers are of an unsaturated polyester resin, the backing layer also including an unsaturated polyester resin, but further including styrene and particles of quartz, zircon, stone or plaster.

BACKGROUND OF THE INVENTION

Field of the invention

The invention relates to methods of producing synthetic stone members, particularly those simulating the appearance of mosaics.

Description of the prior art

The conventional method of producing mosaics, involving the insertion of each element of the mosaic by hand, is a very time-consuming and costly operation, and does not lend itself to mass-production.

The present invention provides a method of producing synthetic stone members and composite assemblies closely simulating the appearance of mosaics which method can be practiced on a mass-production, low-cost basis.

SUMMARY OF THE INVENTION

The invention is broadly characterized by providing a mould having partitions dividing the bottom of the mould into a plurality of compartments each of the shape of an element of the mosaic to be simulated; introducing into the compartments a layer of colored liquid plastic material, the color in the various compartments being in accordance with the color of the various elements of the mosaic to be simulated; permitting the colored plastic material to harden; introducing on the latter a layer of a liquid backing material; permitting the latter layer to harden; and removing the so formed members from the mould.

Preferably, there is first introduced into the mould compartments a layer of a transparent liquid plastic material which is permitted to harden before the introduction of the colored liquid plastic material.

The colored plastic elements formed in the various compartments, with or without the transparent plastic material covering one face, constitute the elements of the mosaic being simulated. The color of these elements may be varied in a random fashion, to provide a fanciful mosaic having randomly colored elements, or they may be varied to form a predetermined design in the mosaic.

Excellent results have been produced when the transparent layer, the colored layer, and the backing layer all include an unsaturated polyester resin. The backing layer is mostly of mineral matter such as quartz, zircon, stone or plaster, the binder being of the unsaturated polyester resin together with styrene.

According to a further aspect of the invention, the liquid plastic material is introduced into the mould by pouring it through a screen having a plurality of spaced strands coated with coloring matter producing colored streaks in the plastic material when it hardens. This process has been used with excellent results for producing plastic members closely simulating marble and other stones.

Further features and advantages of the invention will be apparent from the description below.

BRIEF DESCRIPTION OF THE DRAWING

The invention is herein described, for purposes of illustration only, with reference to the examples set forth below and to the annexed drawings, in which:

FIG. 1 illusrates the method according to one embodiment of the invention;

FIG. 2 illustrates the method according to a second embodiment of the invention;

FIG. 3 illustrates the method according to a further feature of the invention.

DESCRIPTION OF THE PREFERRED EMBODIMENTS

With reference to FIG. 1, there is shown a mould 2 having a plurality of partitions 4 dividing the bottom of the mould into a plurality of similarly-shaped compartments 6. The partitions 4 are preferably of an egg-crate construction, i.e. including a plurality of parallel walls crossing a plurality of further parallel walls, forming square-shape compartments 6. Any other shapes could be formed, for example 5-sided or 6-sided compartments, according to the shape of the mosaic elements desired to be produced.

Three layers 8, 10 and 12 are introduced into the mould. Layers 8 and 10 are relatively thin and are of plastic material, whereas layer 12 is relatively thick and mostly of mineral matter, i.e., particulate quartz, zircon, stone or plaster, with a plastic binder.

The bottom of the mould is first covered with layer 8 of a transparent plastic material. This layer is preferably an unsaturated polyester resin which hardens by heat or upon standing.

Next, layer 10 is applied on top of layer 8 after the latter has hardened. As shown, the upper level of layer 10 is substantially below the top of partitions 4 so that layer 12 would be seen in the finished article along the lines occupied by partitions 4. This produces the effect of the lines of division between the individual mosaic elements, and thereby enhances the mosaic simulation.

Layer 10 is of a colored liquid plastic material, again preferably an unsaturated polyester resin, but including coloring matter. This layer also hardens by heat or upon standing and becomes firmly bonded to the transparent layer 8. The color of the various elements of the mosaic being simulated is determined by the color in layer 10. The color may be distributed in a random fashion in mould 2 or in accordance with a predetermined design. If desired, individual colored elements may be formed in this manner, and then shifted around to different compartments within the same mould or different moulds, to produce the random or other pattern desired in the mosaic being simulated.

After the colored elements 10 are formed and hardened, the continuous top layer 12 of backing material is applied. This material is a mixture of particulate quartz, zircon, stone or plaster, and includes a binder of an unsaturated polyester and styrene. Preferably about 10–25% of the mixture is a polyester resin, 5–15% of styrene and 60–80% of quartz, zircon, stone and/or plaster, the latter being included where hardness and durability are not required. The percentages hereinafter appearing are by weight.

In the FIG. 1 embodiment, layer 12 is applied so that its upper surface extends above the upper surface of the mould partitions 4. In this manner, the layer binds together all the mosaic elements in the article produced by the mould.

In the alternative arrangement illustrated in FIG. 2, the construction of the mould 2', including its partitions 4' forming the compartment 6', is comparable to the construction of mould 2 and its corresponding elements as discussed above. Similarly, the various layers 8', 10' and 12' are applied to the mould in the same manner as the corresponding layers as described in the FIG. 1 arrangement. However, in the FIG. 2 embodiment, the partitions 4' are of greater height, so that when the layer of backing material 12' is introduced into the mould, its upper surface does not extend above the upper surface of the mould partitions 4'. The simulated mosaic member removed from the mould may thus be easily severed into its individual mosaic elements. Instead of increasing the height of the partition 4', the same results could of course be produced by decreasing the thickness of layer 12'.

The FIG. 2 embodiment will thus produce individual mosaic elements which may be assembled to form a mosaic in the conventional manner. FIG. 2, however, illustrates the variation where a flexible layer 14 is applied on top of the layer 12' of backing material. This flexible layer may be a sheet of fabric or the like and serves to hold together the individual mosaic elements when removed from the mould, but permits the mosaic to be shaped so that it can be applied to a curved surface.

The transparent layer, 8 or 8, may be omitted if desired. Also, the bottommost layer may be polished to provide a high glossy surface.

Excellent results have been produced by using the following examples for layers 8, 10 and 12. In all cases, the unsaturated polyester is one obtained by reacting together a dihydric alcohol and a dibasic acid, for example ethylene glycol and fumaric acid. Other polyesters having the facility for cross-linking through the reactive double bonds, forming a hard infusible mass, are known and may be used.

Layer 8 was formed by applying to the bottom of the mould the following liquid plastic material:

|  | Percent |
|---|---|
| Unsaturated polyester resin | 98.49 |
| Hydroquinone (inhibitor) | 0.01 |
| Benzoyl peroxide (catalyst) | 1.00 |
| Dimethyl aniline (accelerator) | 0.50 |

The mixture was permitted to set at room temperature (20° C.) for 15 minutes, and then there was applied layer 10, of the same composition as layer 8 but including dispersed pigment according to the color desired in the various compartments. About 1 mg. of pigment per kg. resin is usually sufficient. The plastic materials in different compartment 6 were pigmented in different colors, according to the colors of the mosaic elements desired to be produced. After the introduction of the pigmented plastic layer 8, it was permitted to harden by standing at room temperature for 15 minutes. The top layer 12 was then applied, and was made of the following mixture:

|  | Percent |
|---|---|
| Unsaturated polyester resin | 18.49 |
| Styrene monomer | 10.00 |
| Quartz | 70.00 |
| Inhibitor, catalyst, accelerator | 1.51 |

The inhibitor, catalyst, and accelerator were the same as set forth above with respect to layer 8.

Layer 8 is preferably about 0.5–1.0 mm. in thickness; layer 10 is preferably thinner, about 0.25–0.5 mm. in thickness; and layer 12 is preferably much thicker, about 1–5 mm. in thickness. Two or more colored layers could be provided to form different types of ornamental effects. The mould 2 may be made of silicon rubber, polyethylene, cellulose acetate, or other similar materials. Cellulose acetate produces a gloss on the finished article, whereas polyethylene produces a non-gloss finish.

FIG. 3 schematically illustrates another manner of applying the colored layers 10 or 10'. A screen 16 is provided having a plurality of spaced strands or threads 18, such as of cotton. The strands are coated with coloring matter, for example by dipping them in a pigment. The same coloring matter may be applied to the whole screen, or different colors may be applied to different portions of the screen. The liquid mixture is introduced into the mould (e.g. mould 2 or 2' in FIGS. 1 and 2) by pouring it through screen 16 so that it picks up coloring matter from the strands 18 as it passes through the screen 16. When the mixture hardens, light colored streaks are formed in it, giving it an ornamental appearance simulating marble or other types of stone, depending upon the colors used.

Following is an example of a liquid mixture that could be used:

|  | Percent |
|---|---|
| Unsaturated polyester resin | 15.0 |
| Styrene monomer | 10.0 |
| Zircon powder | 10.0 |
| Quartz | 62.2 |
| Accelerator | 0.3 |
| Catalyst | 2.5 |

Portions of the strands may be coated with brown, green and yellow pigments, which form light streaks of corresponding colors in the mixture as it is poured through the screen. The pigments may be periodically reapplied to the screen, as by dipping, painting or spraying.

Many changes, variations and applications of the illustrated embodiments may be made within the scope of the invention as defined in the following claims.

I claim:
1. A method of producing synthetic stone members simulating the appearance of mosaics, comprising: providing a mold having partitions dividing the bottom of the mold into a plurality of compartments each of the shape of an element of the mosaic to be simulated; introducing into said compartments a layer of a colored liquid plastic material, the color in the various compartments being in accordance with the color of the various elements of the mosaic to be simulated, by pouring the plastic material through a screen having a plurality of spaced strands each coated with coloring matter producing colored streaks in said plastic material; permitting said colored plastic material to harden; introducing on the latter a layer of a liquid backing material; permitting the latter layer to harden; and removing the so formed members from the mold.

2. A method according to claim 1, wherein said liquid plastic material includes an unsaturated polyester resin, styrene, and mineral matter.

3. A method of producing synthetic stone members, comprising pouring a liquid plastic material into a mould through a screen having a plurality of spaced strands coated with coloring material producing colored streaks in said plastic material when it hardens.

References Cited

UNITED STATES PATENTS

| | | | |
|---|---|---|---|
| 651,657 | 6/1900 | Eshe | 264—256X |
| 964,326 | 7/1910 | Sterner | 264—256X |
| 2,066,964 | 1/1937 | Désagnat | 264—257 |
| 3,097,080 | 7/1963 | Weir | 264—256X |
| 3,230,284 | 1/1966 | Iverson | 264—245X |

FOREIGN PATENTS

| | | | |
|---|---|---|---|
| 229,895 | 5/1959 | Australia | 264—74 |
| 235,730 | 2/1960 | Australia | 264—256 |
| 984,677 | 3/1965 | Great Britain | 264—256 |

ROBERT WHITE, Primary Examiner

A. M. SOKAL, Assistant Examiner

U.S. Cl. X.R.

264—256, 257